(12) United States Patent
Houghton, Jr. et al.

(10) Patent No.: US 6,626,411 B2
(45) Date of Patent: *Sep. 30, 2003

(54) ACTIVE ISOLATION MODULE

(75) Inventors: Worthington Bowie Houghton, Jr., Newport Beach, CA (US); Eric Anderson, Mountain View, CA (US); Jack Marcinkowski, San Pedro, CA (US); Vyacheslav Ryaboy, Irvine, CA (US)

(73) Assignee: Newport Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/798,621

(22) Filed: Mar. 2, 2001

(65) Prior Publication Data

US 2001/0009264 A1 Jul. 26, 2001

Related U.S. Application Data

(63) Continuation of application No. 09/114,773, filed on Jul. 14, 1998, now Pat. No. 6,209,841.

(51) Int. Cl.[7] .............................................. F16M 13/00
(52) U.S. Cl. ........................ 248/550; 248/638; 267/136
(58) Field of Search ................................ 248/550, 638, 248/556, 560, 562, 636; 267/136, 140.14; 188/378, 379, 380

(56) References Cited

U.S. PATENT DOCUMENTS

| | | | | |
|---|---|---|---|---|
| 3,442,475 A | * | 5/1969 | Rivin | 248/638 |
| 3,460,768 A | * | 8/1969 | Rivin | 248/638 |
| 3,751,025 A | * | 8/1973 | Beery et al. | 267/166 |
| 3,917,201 A | * | 11/1975 | Roll | 248/638 |
| 5,000,415 A | * | 3/1991 | Sandercock | 248/550 |
| 5,219,051 A | * | 6/1993 | Davis | 188/378 |
| 5,251,863 A | * | 10/1993 | Gossman et al. | 248/550 |
| 5,285,995 A | * | 2/1994 | Gonzalez et al. | 248/550 |
| 5,327,061 A | * | 7/1994 | Gullapalli | 248/550 X |
| 5,530,198 A | * | 6/1996 | Ishii | 84/21 |
| 5,564,537 A | * | 10/1996 | Shoureshi | 267/136 |
| 5,603,387 A | * | 2/1997 | Beard et al. | 267/64.24 X |
| 5,653,317 A | * | 8/1997 | Wakui | 188/378 |
| 5,660,255 A | * | 8/1997 | Schubert et al. | 188/378 |
| 5,765,800 A | * | 6/1998 | Watanabe et al. | 248/550 |
| 5,794,912 A | * | 8/1998 | Whittaker et al. | 248/638 |
| 5,823,307 A | * | 10/1998 | Schubert et al. | 267/136 |
| 5,941,920 A | * | 8/1999 | Schubert | 701/37 |
| 6,022,005 A | * | 2/2000 | Gran et al. | 267/136 |
| 6,036,162 A | * | 3/2000 | Hayashi | 248/550 |
| 6,209,841 B1 | * | 4/2001 | Houghton, Jr. et al. | 248/550 |

OTHER PUBLICATIONS

Rivin, Eugene I., "Vibraiton Isolation of Precision Equipment", Precision Engineering, 1995, pp. 41–56, vol. 17.*

"Marsh Mellow Springs Vibration Isolaiton Design Manual", 1998, Firestone Industrial Products Company.*

Rivin, Eugene I., "Shaped Elastomeric Components for Vibraiton Control Devices", Sound and Vibraiton, Jul. 1999, pp. 18–23, vol. 33, No. 7.*

* cited by examiner

Primary Examiner—Ramon O. Ramirez
Assistant Examiner—Tan Le
(74) Attorney, Agent, or Firm—Irell & Manella LLP

(57) ABSTRACT

A vibration isolator for isolating a load from a floor. The vibration isolator may have an active isolator assembly that isolates the load in a first direction and a passive isolator assembly that isolates the member in a second direction or directions. The active isolator assembly may include a single actuator that is coaxially aligned with a sensor. The sensor and actuator can be connected to a controller which together provide active isolation of the load. The passive isolator assembly may include a pendulum that is coupled to a dashpot. Providing a system with just one actuator significantly reduces the cost of the vibration isolator with respect to isolators of the prior art.

7 Claims, 5 Drawing Sheets

ACTIVE ISOLATION MODULE

REFERENCE TO CROSS-RELATED APPLICATION

This application is a continuation of application Ser. No. 09/114,773, filed on Jul. 14, 1998, U.S. Pat. No. 6,209,841.

BACKGROUND OF THE INVENTION

1. Field of the Invention

The present invention relates to a vibration isolator that can isolate a load such as a table platform from a surface such as a floor of a building.

2. Background Information

It is sometimes desirable to prevent relative movement between two surfaces. For example, integrated circuit are typically fabricated on a platform with photolithographic equipment. The location of directed light used to align and fabricate the integrated circuit must be very accurate.

The table is typically placed on the floor of a clean room. The floor may undergo vibrational movement that can be transferred to the table. The vibration may cause a displacement of the table which reduces the accuracy of the fabrication process.

Some tables incorporate vibration isolators to reduce or prevent the floor vibration from being transferred to the table. U.S. Pat. No. 5,000,415 issued to Sandercock and assigned to the assignee of the present invention, Newport Corp., discloses a vibration isolator that has an active isolator assembly which actively isolates a load from a floor. The active isolator assembly includes a plurality of piezoelectric actuators which can vary the distance between the load and the floor surface to compensate for movement in the floor. For example, the floor may oscillate so that the floor surface moves toward the load and away from the load. When the floor moves toward the load the piezoelectric actuators contract so that the motion of the load relative to inertial space is reduced compared to that of the floor. Likewise, when the floor moves away from the load the actuators expand.

The active vibration isolator disclosed in the Sandercock patent includes a sensor that senses the movement of the floor and circuitry to provide a control loop to synchronize the contraction/expansion of the actuators with the movement in the floor. Sandercock also discloses the use of sensors which sense the velocity of the load to provide a feedback loop that is coupled to the feedforward loop.

The piezoelectric actuators and control loops are capable of isolating the load for relatively low frequencies. To roll off high frequencies, Sandercock employs an elastomeric mount that is interposed between the load and the actuators. The elastomeric mount has a resonant frequency that varies with the weight of the load. The variation in the resonant frequency requires a calibration of the system during installation, or a reconfiguration, to compensate for a different weight of the load. It would be desirable to provide an elastomeric mount which has a resonant frequency that is relatively constant for a predetermined range of load weights.

U.S. Pat. No. 5,660,255 issued to Schubert et al. discloses a vibration isolator which has a number of piezoelectric actuators to isolate a load in a vertical direction and additional piezoelectric actuators to isolate the load in a horizontal plane. The Schubert vibration isolator provides active isolation in both the vertical and horizontal directions. The piezoelectric actuators are relatively expensive. Therefore providing additional horizontal actuators increases the cost of assembling the vibration isolator. It would be desirable to have effective vibration isolators that can provide vertical and horizontal isolation, and which cost less to produce than isolators of the prior art.

Even with vibration isolation the load may move relative to the floor in the horizontal plane. It may be desirable to move and adjust the load to an original reference position. It would therefore be desirable to provide a docking system which can align and secure the load in a reference position.

The drive signal which excites the piezoelectric actuator is typically a function of a gain value and a transfer function which are either stored in a memory device of a controller that controls the system, or built into analog electronics that control the system. The stored transfer function determines the transient response time and bandwidth of the isolator. Vibration isolators of the prior art do not allow the system operator to vary the transfer function and the resultant transient response time and bandwidth of the system. It would be desirable to provide a vibration isolator which allows an operator to vary the transfer function used to determine the drive signal of the actuator.

SUMMARY OF THE INVENTION

One embodiment of the present invention is a vibration isolator for isolating a load from a surface. The vibration isolator may have an active isolator assembly that isolates the load in a first direction and a passive isolator assembly that isolates the load in a second direction.

DETAILED DESCRIPTION OF THE INVENTION

One embodiment of the present invention is a vibration isolator for isolating a load from a surface. The vibration isolator may have an active isolator assembly that isolates the load in a first direction and a passive isolator assembly that isolates the load in a second direction. The active isolator assembly may include a single actuator that is coaxially aligned with a sensor. The sensor and actuator can be connected to a controller which together provide active isolation of the load. The passive isolator assembly may include a pendulum that is coupled to a dashpot. Providing a system with just one actuator significantly reduces the cost of the vibration isolator with respect to isolators of the prior art.

Figure 1:
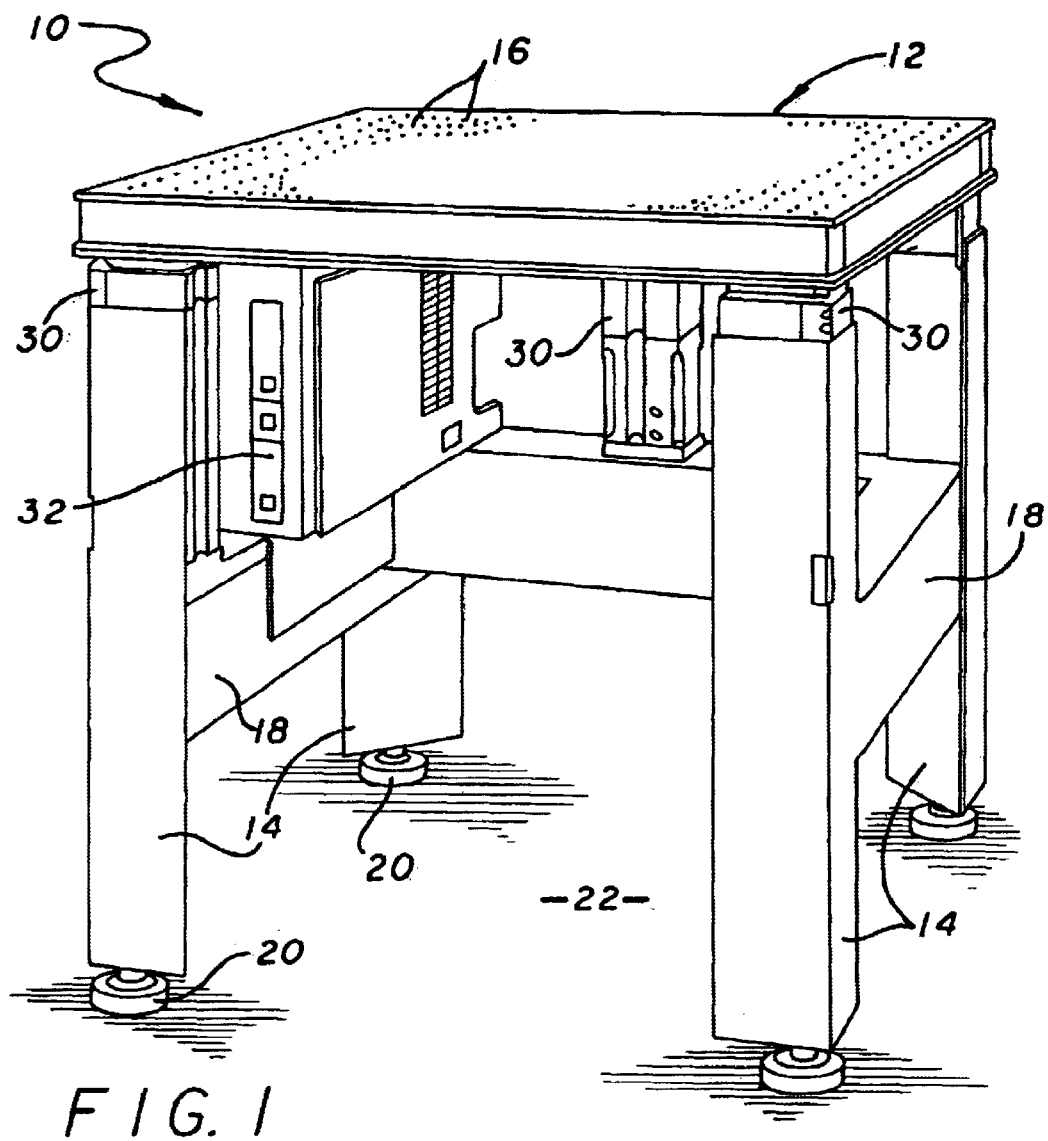
FIG. 1 is a perspective view of an embodiment of a table assembly of the present invention.

Referring to the drawings more particularly by reference numbers, FIG. 1 shows an embodiment of a table assembly 10 of the present invention. The assembly 10 may include a platform 12 that is supported by a plurality of legs 14. The platform 12 may have a honeycomb construction and include a plurality of mounting holes 16 which allow items such as optical mounts to be attached to the table 10. As an alternate embodiment, the platform 12 may be constructed from a slab of granite.

The legs 14 may be interconnected by beams 18. The legs 14 extend from a plurality of feet 20. The feet 20 are in contact with a surface 22 such as a floor of a building structure.

Figure 2:
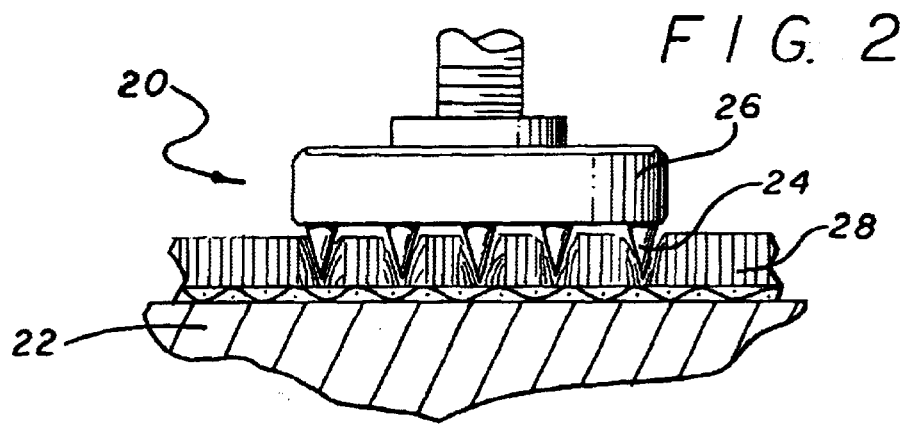
FIG. 2 is a side view of a foot of the table assembly.

As shown in FIG. 2, each foot 20 may include a number of cleats 24 that extend from a plate 26. The cleats 24 may penetrate a carpet 28 and secure the table 10 to the floor. The cleats 24 assist in mechanically connecting the table 10 to a solid floor located beneath the carpet.

Referring to FIG. 1, the table assembly 10 may include one or more vibration isolators 30. The isolators 30 are typically mounted to the beams 18 of the table 10, or alternatively mounted in the table legs 14. The floor may undergo a vibrational movement that creates a varying displacement of the surface 22. The isolators 30 isolate a load such as the platform 12 from the varying displacements of the surface 22.

The table assembly 10 may further include a controller 32 which controls the vibration isolators 30. The controller 32 may control all three isolators 30. Although three isolators 30 are shown and described, it is to be understood that four or any other combination of isolators 30 may be employed in the present invention.

Figure 3:
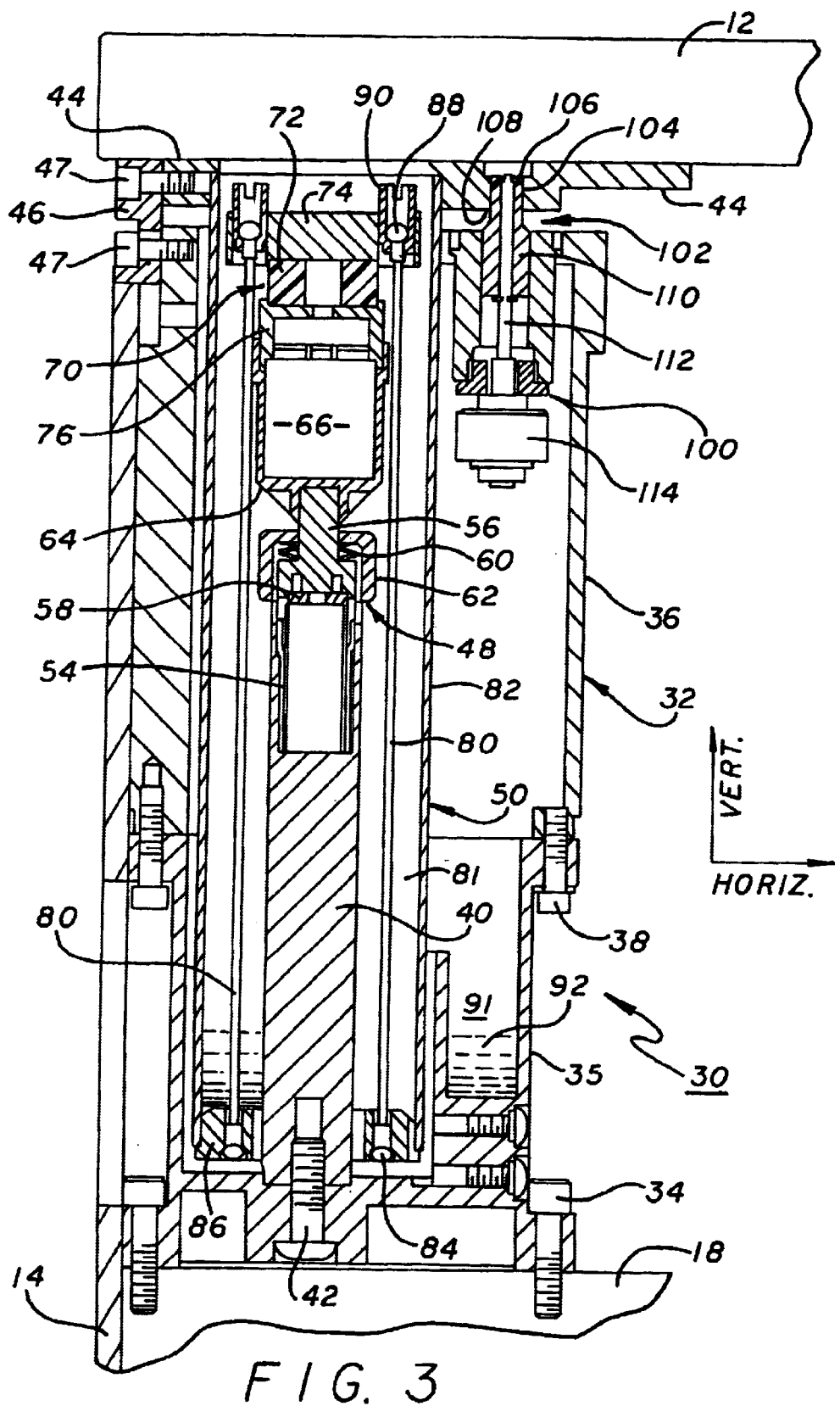
FIG. 3 is a cross-sectional view of an embodiment of a vibration isolator of the table assembly.

FIG. 3 shows an embodiment of a vibration isolator 30. The isolator 30 may have an outer housing 32 that is mounted to a mounting surface such as a beam 18 by fasteners 34. The housing 32 may include a lower section 35 that is attached to an upper section 36 by fasteners 38. The isolator 30 may include a post 40 that is attached to the lower section 35 of the housing 32 by a fastener 42. The isolator 30 may also include a top plate 44 that supports the platform 12. When the table assembly 10 is transported, the top plate 44 and platform 12 may be secured by a locking plate 46 and fasteners 47 that screw into the plate 44 and the housing 32.

The isolator 30 may include an active isolator assembly 48 and a passive isolator assembly 50 that isolate the top plate 44 from the housing 32. The active isolator assembly 48 may isolate the plate 44 and platform 12 in a first vertical direction. The passive isolator assembly 50 may isolate the plate 44 and platform 12 in a second horizontal direction or plane.

The active isolator assembly 48 may include a piezoelectric actuator 54 that is mounted to the post 40. The piezoelectric actuator 54 may receive a drive signal that either increases or decreases the height of the actuator 54 to isolate the plate 52 and platform 12 in the vertical direction. The piezoelectric actuator 54 may be constructed from a plurality of piezoelectric elements which are maintained in compression by a plurality of elastic elements such as bellville springs 60. The actuator 54 also includes a push rod 56 connected to the piezoelectric elements by connecting blocks 58. The springs 60 are captured by a nut 62 that is screwed onto the post 40.

The push rod 56 is attached to a cup 64 which houses a sensor 66. The sensor 66 may be a geophone which provides an electrical output signal that is a function of the motion of the actuator push rod 56.

The isolator 30 may include a filter assembly 70 that is coupled to the active isolator assembly 48 and the passive isolator assembly 50. The filter assembly 70 may include an elastomer 72 that is attached to a coupler plate 74 and a plug 76 which is screwed into the cup 64. The filter assembly 70 filters out relatively high frequency vibrations introduced to the isolator 30 so that high frequency components are not transferred from the floor 22 to the plate 44 and platform 12. This reduces the requirements for active system bandwidth.

Figure 4:
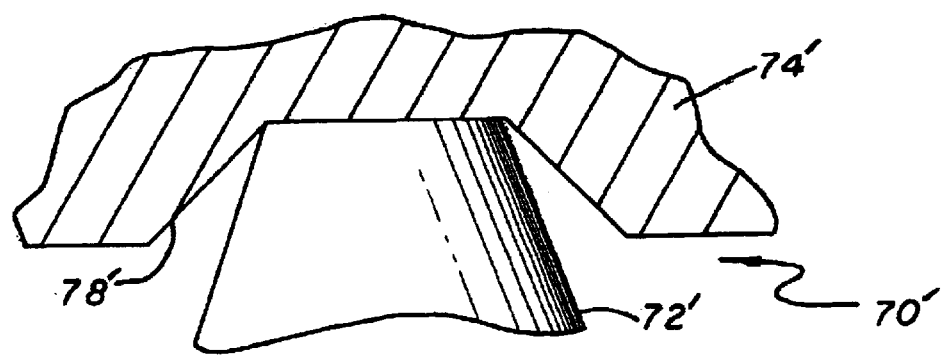
FIG. 4 is a cross-sectional view of a damper assembly of the vibration isolator.

FIG. 4 shows an embodiment of a filter assembly 70' which has a resonant frequency that remains relatively constant for a predetermined range of forces that may be applied to the assembly 70. The assembly 70' may include a profiled elastomer 72' that is located within a profiled cavity 78 of the coupler plate 74. The profiles of the elastomer and the cavity are chosen so that, as load increases, the elastomer is pressed against the cavity walls, thereby increasing the stiffness which allows for relatively constant natural frequency. By way of example, a conical shaped elastomer and cavity are chosen for the embodiment shown in FIG. 4.

Referring to FIG. 3, the sensor 66 has a center axis that is coaxial with a center axis of the actuator 54. Additionally, the center axes of the sensor 66 and actuator 44 may be coaxial with a center axis of the filter assembly 70. The coaxial relationship between the actuator 54 and sensor 66 allow the sensor 66 to sense axial translational movement with minimal bending movements.

The passive isolator assembly 50 may include a plurality of cables or other tension members 80 that extend along an inner channel 81 of a tube 82. The tube 82 is in contact with the top plate 44. The bottom ends of the cables 80 each have knobs 84 that are captured by an end plate 86. The end plate 86 is attached to the tube 82. The top end of the cables 80 have knobs 88 that are captured by cable plugs 90 which are screwed into the coupler plate 74. The cables 80 create a pendulum assembly which allows the top plate 44 and tube 80 to translate horizontally about the post 40.

The lower housing section 35 may include a reservoir 91 that is filled with a fluid 92 such as oil. A portion of the tube 82 extends into the reservoir 91. The fluid filled reservoir 91 creates a dashpot that damps horizontal movement of the plate 44.

Figure 5:
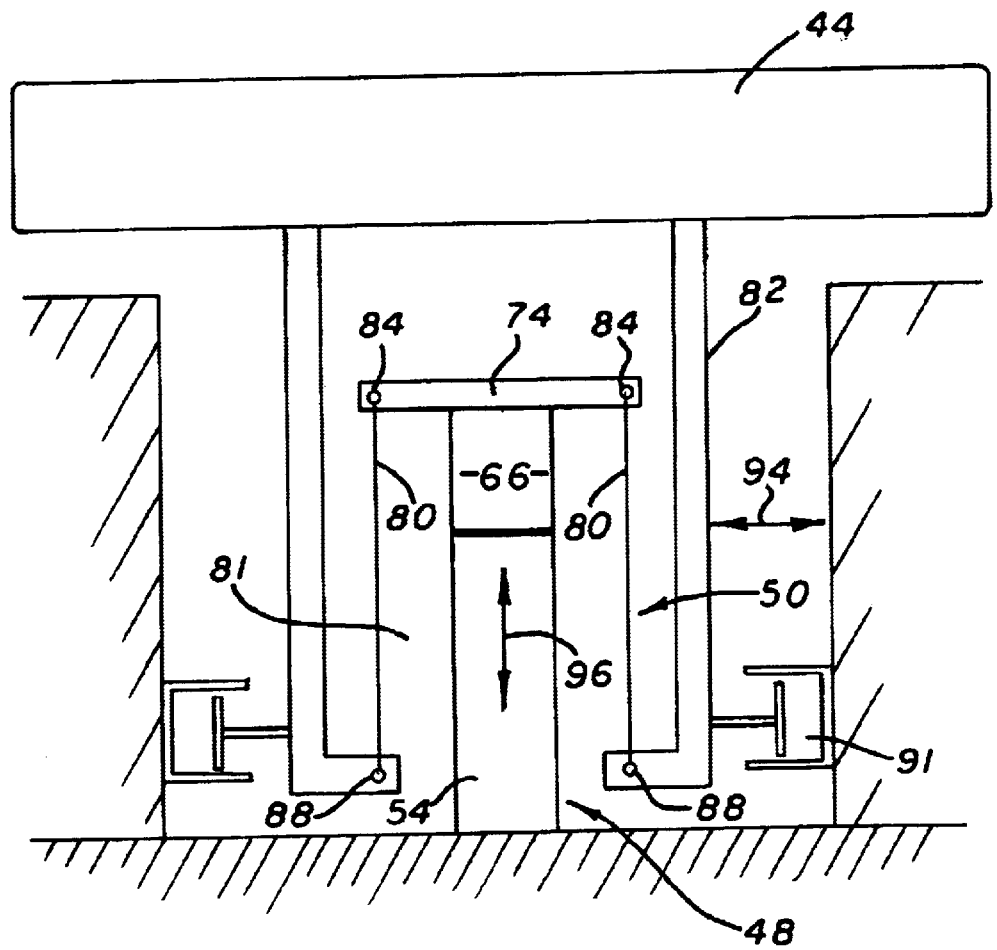
FIG. 5 is a schematic of the isolator.

FIG. 5 shows a schematic of the active 48 and passive 50 isolator assemblies. The plate 44 is coupled to the coupler plate 74, sensor 66 and actuator 54 by the tube 82 and cables 80. Flexing of the cables 80 between the knobs 84 and 88 allows horizontal motion of the passive isolator assembly 50. The passive isolator assembly 50 allows relative horizontal movement between the plate 44 and the floor 22 as indicated by the arrow 94. The passive assembly 50 also damps the movement with the dashpot reservoir 91.

The actuator 54 varies in height to compensate for movement of the floor 22 in the vertical direction as indicated by the arrow 96. The active isolator assembly 48 prevents or reduces movement of the floor 22 from being transferred into the plate 44.

Referring to FIG. 3, during operation of the isolator 30, the top plate 44 and platform 12 may move relative to the floor 22. It may be desirable to move the top plate 44 and platform 12 back to a reference position.

The isolator 30 may have a docking assembly 100 that moves and secures the plate 44 and platform 12 to the reference position. The docking assembly 100 may include a pin 102 that is inserted into an aperture 104 of the plate 52. Both the pin 102 and the aperture 104 may have lead in chamfer surfaces 106 and 108, respectively, which induce a movement of the plate 52 so that a center axis of the aperture 104 is aligned with a center axis of the pin 102. The center axis of the pin 102 provides a reference point for the plate 52 and platform 12.

The pin 102 may include a sleeve 110 that is attached to an output shaft 112 of an actuator 114. The actuator 114 may be a linear stepper motor. The actuator 114 is attached to the housing 32. The actuator 114 can move the pin 102 into and out of the aperture 104. During isolation, the pin 102 is pulled out of the aperture 104 to allow relative horizontal movement between the plate 44 and the floor 22. The pin 102 can be moved back into the aperture 104 to align the plate 44 and secure the platform 12.

Figure 6:
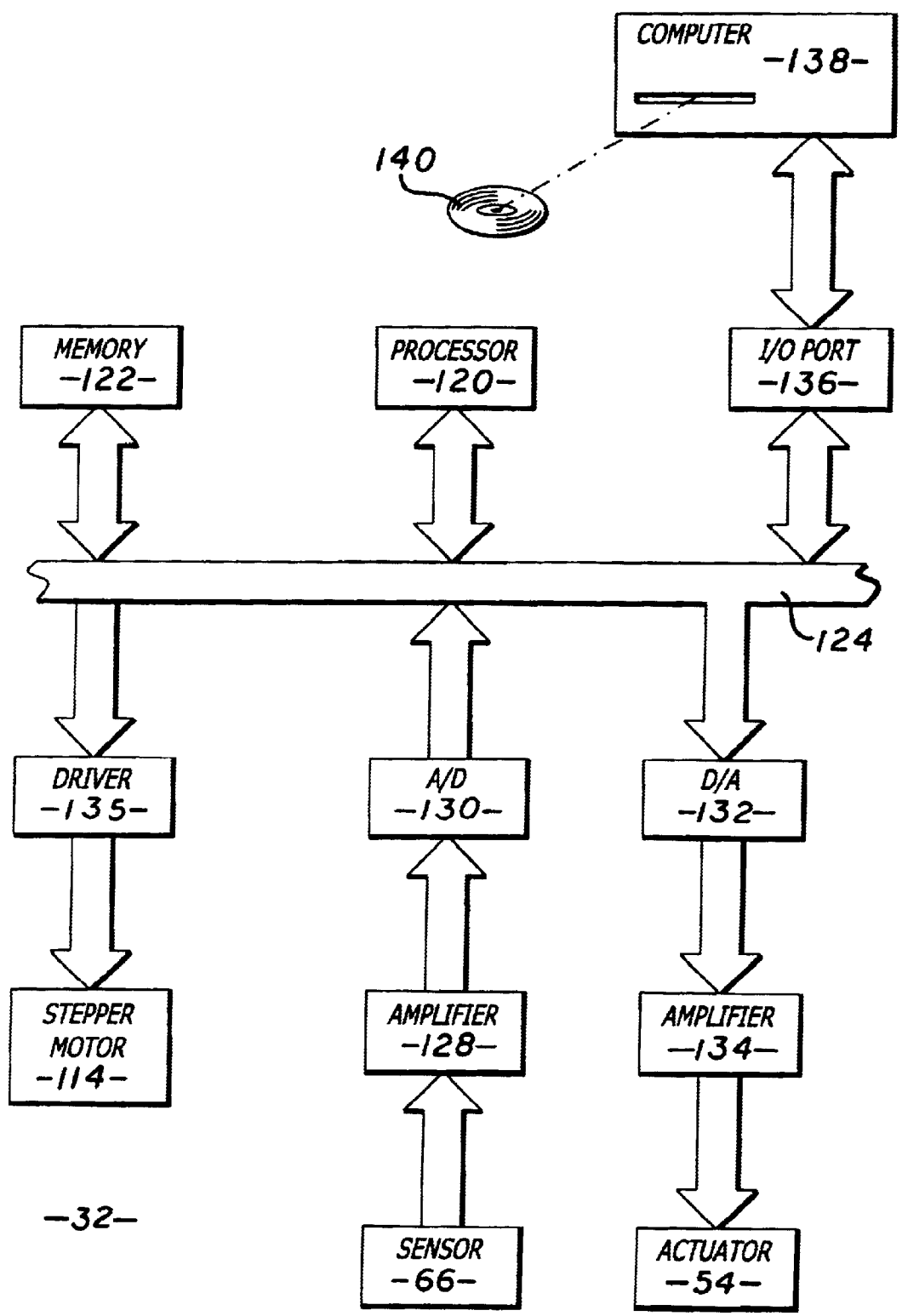
FIG. 6 is an electrical schematic of a controller that controls the isolator.

FIG. 6 shows a schematic of an embodiment of the controller 32 that controls the vibration isolators 30. The controller 32 may include a processor 120 that is connected to a memory device 122 by a bus 124. The processor 120 may be a digital signal processor (DSP), the memory device may be non-volatile random access memory such as "flash" memory. The processor 120 may perform software routines in accordance with instructions and data stored in the memory device 122.

The controller 32 may include an amplifier 128 and an analog to digital (A/D) converter 130 that are connected to the sensor 66 and the bus 124. The sensor 66 generates an output signal that is a function of the motion of the actuator push rod 56 shown in FIG. 3. The amplifier 128 amplifies, and may integrate and/or filter, the output signal of the sensor 66. The amplified signal is converted into a digital sequence by the A/D 130 and provided to the processor 120.

The controller 32 may also include a digital to analog (D/A) converter 132 and an amplifier 134 that are connected to the actuator 54 and bus 124. The processor 120 provides digital sequences that are converted to an analog signal by the D/A 132. The output of the D/A 132 is amplified and provided to the actuator 54 shown in FIG. 3, to cause a contraction or expansion of the piezoelectric.

The stepper motor 114 may also be coupled to the bus 124 by a driver circuit 135. The processor 120 may provide commands to actuate the motor 114 and move the pin 102 shown in FIG. 3 in and out of the aperture 104. Although not shown, the processor 120 may be connected to A/D converters, D/A converters and amplifiers for each isolator of a multiple isolator table assembly. The control system may have a single input single output architecture or a multiple input multiple output architecture between the processor and the isolators.

The controller 32 may include an input/output (I/O) port 136 that is connected to the bus 124. A computer 138 can be connected to the controller 32 through the I/O port 136 to store or read information in the memory device 122. By way of example, the processor 120 typically provides output to the actuator 54 in accordance with a software routine that utilizes a gain value and a transfer function. The gain and transfer function can be stored in the memory device 122 through the I/O port 136.

A number of different transfer functions can be provided on a storage medium such as a floppy or optical disk 140 that is loaded into the computer 138. The disk 140 may also contain a software routine which allows the operator to select one transfer function from a list of different transfer functions. Different transfer functions may be stored in memory 122 and selected by the operator using the computer 138 and the I/O port 136. Different transfer functions may provide different transient response times for the isolators 30. The selected transfer function is then stored in the memory device 122 through the I/O port 136. The software on the disk 140 may also allow the operator to select a gain value that is used to compute the output signal provided to the actuator 54. The system thus allows the user to select the gain and transient response time of the isolators 30.

Figure 7:
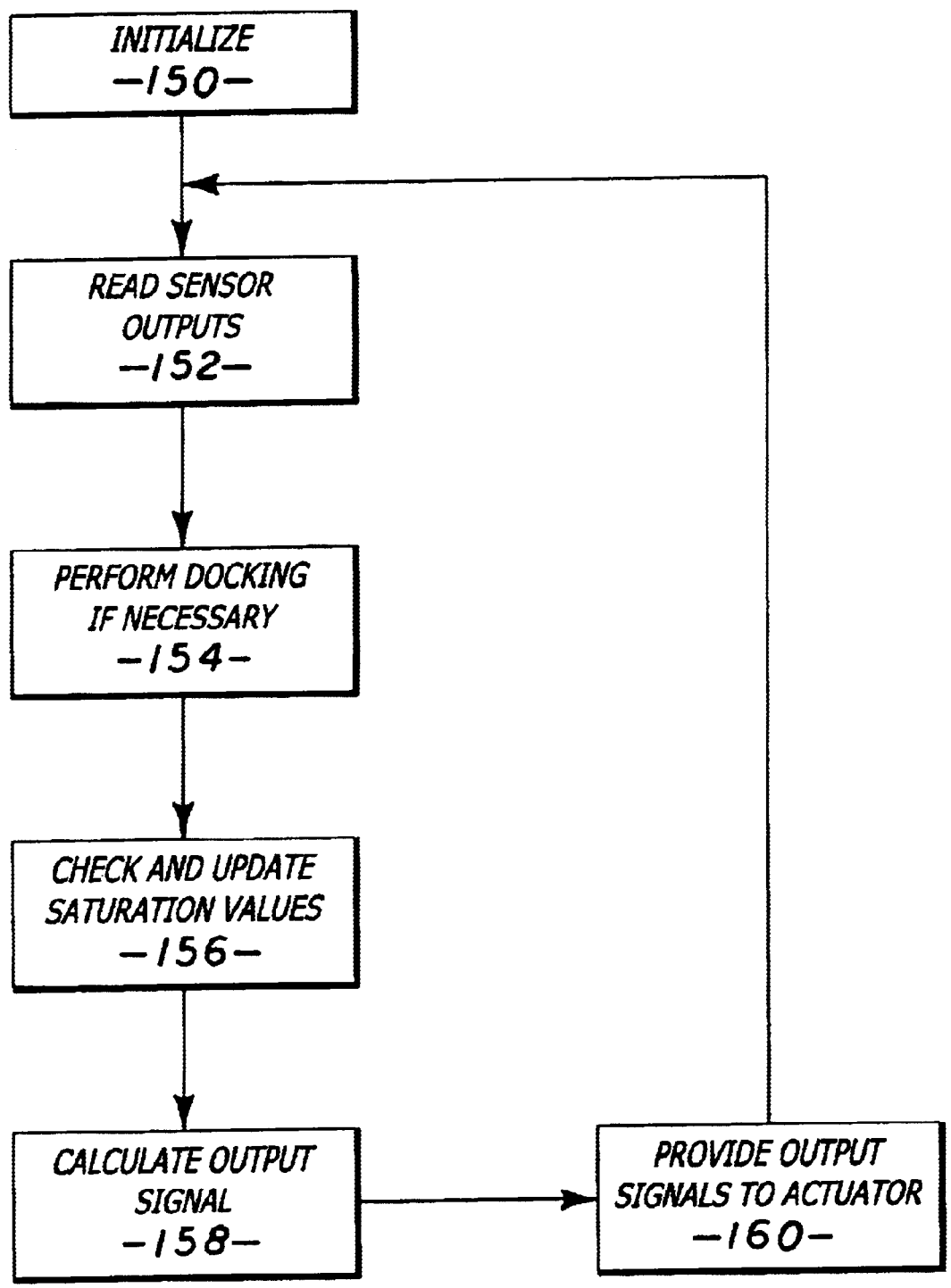
FIG. 7 is a flowchart showing a routine performed by a controller of the isolator.

FIG. 7 shows a flowchart of a routine performed by the processor 120. When the system is initially powered up the processor performs an initialization routine to undock the docking assembly, provide system identification and DC offset correction in process block 150. The DC offset correction may include reading a DC level from the signal generated by the sensors. The DC level can be stored and then later subtracted from the output signals of the sensors during operation to normalize the signals.

After initialization, the process continues to process block 152 to read the output signals of the sensors. The process then determines whether to perform a docking routine in block 154. In block 156 the saturation values are checked and updated.

The output signals for the actuators are calculated in block 158. The calculations utilize the transfer function and gain value stored in the memory device. In block 160 the output signals are provided to the D/A converter to actuate the piezoelectric devices. The process then returns to block 152 and repeats the routine.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A vibration isolator which isolates a load that is separated from a floor, comprising:

an actuator that is coupled to the load and the floor and which has a variable height;

a sensor that senses a vibrational movement of a point between the load and the floor;

a memory that stores a plurality of different transfer functions for said actuator;

an input device that allows an operator to select one of the transfer functions;

a controller which is coupled to said actuator and said sensor and which provides an output to vary the height of said actuator in response to a feedback signal from said sensor to damp the vibrational movement in a transient response time, said output being a function of a transfer function that is selected from the plurality of different transfer functions that each create a different transient response time.

2. The vibration isolator of claim 1, further comprising a passive isolator assembly that passively isolates the load.

3. The vibration isolator of claim 2, wherein said passive isolator assembly includes a pendulum assembly.

4. The vibration isolator of claim 3, wherein said pendulum assembly includes a cable that is coupled to the load.

5. The vibration isolator of claim 3, wherein said passive isolator assembly includes a dashpot that is coupled to said pendulum assembly and the floor.

6. The vibration isolator of claim 1, further comprising a docking assembly that secures the load relative to the floor.

7. The vibration isolator of claim 6, wherein said docking assembly includes a pin that can be inserted into an aperture of a plate that supports the load.

* * * * *